(12) United States Patent
Tranovich et al.

(10) Patent No.: US 6,808,162 B2
(45) Date of Patent: Oct. 26, 2004

(54) ROTARY 2-WAY SERVOVALVE

(75) Inventors: Stephen J. Tranovich, Avon, CT (US); Luliana G. Truia, Meriden, CT (US)

(73) Assignee: Victory Controls, LLC, Bristol, CT (US)

( * ) Notice: Subject to any disclaimer, the term of this patent is extended or adjusted under 35 U.S.C. 154(b) by 34 days.

(21) Appl. No.: 10/242,079

(22) Filed: Sep. 12, 2002

(65) Prior Publication Data

US 2003/0052292 A1 Mar. 20, 2003

Related U.S. Application Data

(60) Provisional application No. 60/323,545, filed on Sep. 19, 2001.

(51) Int. Cl.[7] ................................................ F16K 5/10
(52) U.S. Cl. .................... 251/209; 251/283; 251/121; 251/129.12
(58) Field of Search ................................. 251/121, 209, 251/129.12, 283

(56) References Cited

U.S. PATENT DOCUMENTS

| | | |
|---|---|---|
| 467,153 A | 1/1892 | Chatard |
| 1,015,164 A | 1/1912 | Fowden |
| 1,141,276 A | 6/1915 | Smith |
| 2,229,933 A | 1/1941 | Parker |
| 3,342,449 A | 2/1965 | Jackson |
| 3,443,793 A | 5/1969 | Hulsey |
| 3,558,100 A | 1/1971 | Hulsey |
| 3,612,102 A | 10/1971 | Hulsey |
| 3,774,634 A * | 11/1973 | Bonney ........................ 251/283 |
| 3,804,119 A * | 4/1974 | Christensen ................. 251/209 |
| 3,905,275 A * | 9/1975 | Saida et al. ................. 91/376 R |
| 4,135,544 A * | 1/1979 | MacLeod ...................... 251/283 |
| 4,177,834 A * | 12/1979 | Bonney ........................ 251/283 |
| 4,526,154 A | 7/1985 | Di Domenico |
| 4,881,718 A | 11/1989 | Champagne |
| 5,009,393 A * | 4/1991 | Massey ........................ 251/209 |
| 5,083,744 A | 1/1992 | Reinicke et al. |
| 5,241,990 A * | 9/1993 | Cook ........................... 251/209 |
| 5,242,150 A * | 9/1993 | Shiffler et al. ............... 251/209 |
| 5,370,154 A | 12/1994 | Greer |
| 5,868,165 A | 2/1999 | Tranovich |

* cited by examiner

Primary Examiner—John Bastianelli

(57) ABSTRACT

A rotary two-way servovalve provides a continuously variable orifice size in response to an input rotation while minimizing actuation torque. The valve is comprised of a cylindrical spool which is fitted to and rotates within a bore in a body. Fluid is fed into an axial hole in the spool through an inlet groove and cross holes and is metered out through one of a pair of diametrically opposed metering slots depending upon the angle of rotation. The second slot is provided to balance the pressure forces on the spool. Other features are a pivot which provides the axial location of the spool in the body while also sealing the spool, and a drain hole to prevent pressure from moving the spool axially. The valve is intended to be driven by an electrical rotary actuator such as a step motor, servo motor, or a limited angle torque motor.

20 Claims, 4 Drawing Sheets

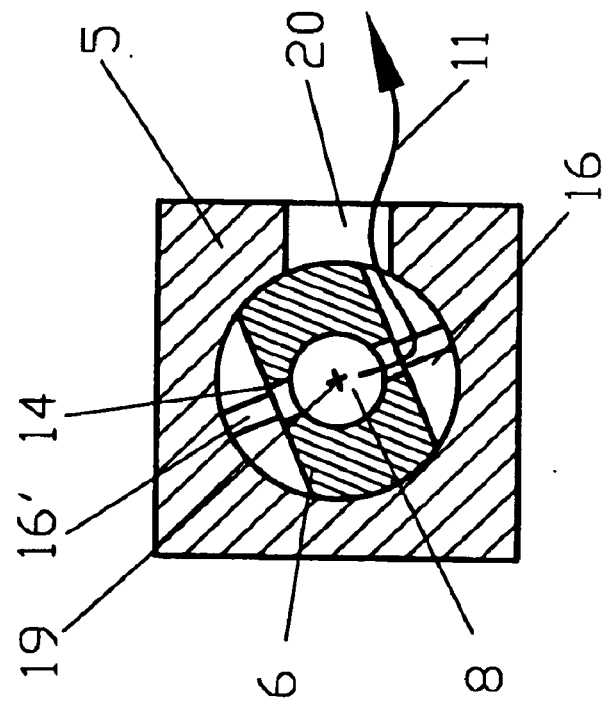
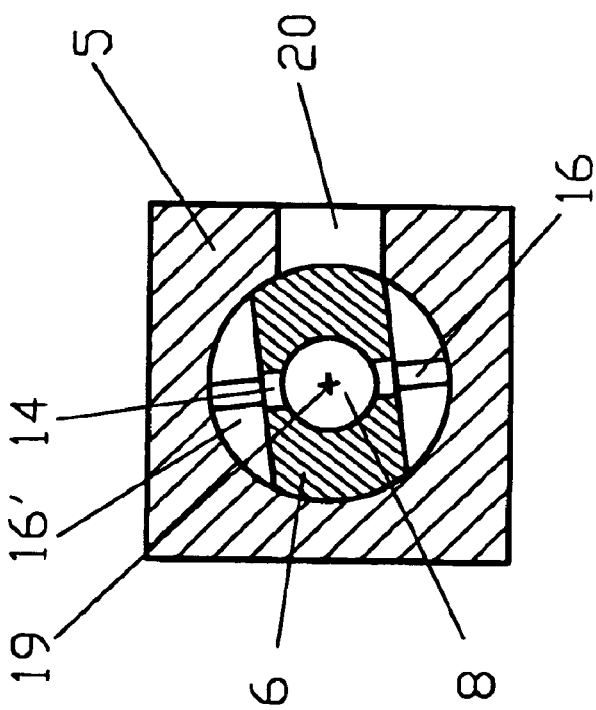

ROTARY 2-WAY SERVOVALVE

CROSS REFERENCE TO PROVISIONAL PATENT APPLICATION

This invention is the subject of a Provisional Patent Application filed by the applicants on Sep. 19, 2001 and entitled "2-Way Servo Metering Valve". The Application No. is 60/323,545.

BACKGROUND

1. Field of the Invention

This invention relates to metering valves in general and more specifically to 2-way servovalves used for the precise control of the flow of liquids and gasses.

2. Description of Prior Art

Precisely variable control of flow in response to an electrical signal is useful for a number of applications such as welding gas flow control, biomedical gas flow control, mixing of liquids in a laboratory, various functions in automotive fuel and suspension systems, etc. Servovalves use a metering valve in conjunction with an electromechanical actuator to provide this precisely variable control of flow. They are often used in conjunction with electronic feedback of a process variable to provide improved flow regulation. There are a number of advantages to using a rotary valve type to accomplish the metering valve function, including the ready availability of rotary actuation devices such as step motors and torque motors, the elimination of backlash from rotary to linear conversion mechanisms, high frequency response, ease in sealing, and lower cost. Considering rotary metering valve mechanisms, there is a large body of prior art associated with various types of 2-way valves such as ball valves, rotary plug valves, needle valves, and butterfly valves to consider. These devices, in general, fail to provide one or more attributes which are desirable for servovalve applications, including a continuous linear relationship between the input signal and the flow (also known as a linear flow gain), low actuation forces to minimize mechanical hysteresis, low internal leakage when in the closed position, and fast response. In the following discussion, the words "plug" and "spool" will be used interchangeably to describe the cylindrical part that is rotated inside the plug-type rotary valve to regulate the flow.

Various approaches have been described to improve one or another of the aforementioned desirable characteristics in the basic 2-way valve types. For example, U.S. Pat. No. 3,4443,793 to Hulsey discloses a rotary plug valve and a similar ball valve, both with slots of complex geometry intended to provide improved metering by varying the orifice flow area of the device as it rotates. The device shown would not, however, have suitable low actuation torque due to excessive seal drag and pressure imbalances inherent in the design. Hulsey discloses another variation to hollow plug and ball type valves in U.S. Pat. No. 3,612,102 in which spiral flow ports in the plug provide the metering function. In addition to the pressure imbalance, the hollow plug disclosed would have substantial axial pressure forces to be restrained by the valve ends, causing additional frictional forces and rendering it unsuitable for servo applications. For plug-type valves in general, this open-end configuration and the resulting axial pressure loads, along with substantial side loads due to imbalanced pressure at the metering port, are common failings in the prior art. For example, an early use of a hollow cylindrical spool in a rotary valve, along with shaped ports to provide linear flow gain is in U.S. Pat. No. 1,141,276 by Smith for a Carburetor. Another example with both pressure imbalances is U.S. Pat. No. 3,342,449 by Jackson.

U.S. Pat. No. 5,242,150 to Shiffler and Loy discloses a rotary servovalve intended to solve the problem of an acoustically quiet valve. In this design, a hollow spool is shown which is closed on both ends, alleviating the end loading problem, although the device is impossible to produce as shown since no method of producing such a central cavity in the otherwise solid spool is described. The method used to feed the inlet flow into the spool requires multiple diameters, greatly complicating the process of producing the spool. The required close fit between the spool and the bore to minimize internal leakage is mitigated against by a multiplicity of parts that must be concentric in order to allow such a close fit. Thrust bearings are described to retain the position of the spool, increasing friction O-ring seals on the spool also contribute to excessive friction. A linearization method for the flow gain is also described, but this requires machining a complex shape in the metering passage in the spool which cannot be accomplished with standard machine tools, and is thus expensive.

Note that all of the prior art discussed above involves cutting complex shapes into the spool and/or its mating receiver part so as to attain the linear flow output with rotation. These shapes are difficult to machine with conventional machine tools and thus add considerably to the cost of the devices.

U.S. Pat. No. 5,868,165 to Tranovich (one of the co-inventors in the current application) discloses a 4-way rotary servovalve in which rectangular slots are opened to a hole to provide linear output flow gain. However, this valve is much more complex than the present invention, is intended for 4-way operation, and utilizes a metering pin which occludes with the metering port in the closed position, and utilizes bearings to fix the position of the spool. The method of feeding the inlet flow to the spool along the outside surface thereof is completely different than that described herein. All of these features drive up the cost and render the valve unsuitable for the 2-way servovalve application.

OBJECTS AND ADVANTAGES

The first object of the present invention is to provide a valve with the necessary and desirable performance characteristics for servo applications including: 1) minimizing pressure loading and its attendant frictional forces so as to reduce mechanical hysteresis and 2) providing a simple flow path which varies in area, and thus flow, linearly as the spool rotates. It is a further object of the invention to minimize the internal leakage of the valve in its shut off condition. It is another object of the present invention to provide a simple and producible design for a 2-way servovalve, which is easily produced on standard machine tools. The resulting valve mechanism can be easily controlled by rotation with a conventional step motor using well-known micro-stepping technology or preferably with a limited angle servo motor system, such as is described in U.S. Pat. No. 6,034,499 by Tranovich Further objects and advantages will become apparent from consideration of the drawings and ensuing description

DESCRIPTION OF DRAWINGS

FIGS. 3a and 3b are cross sections taken perpendicular to the cylindrical axis of the spool through the plane of the metering slot as shown by line 3—3 in FIG. 2. FIG. 3a shows the valve in its closed position and FIG. 3b shows the valve in a partially open position.

DETAILED DESCRIPTION OF THE INVENTION

Figure 1:
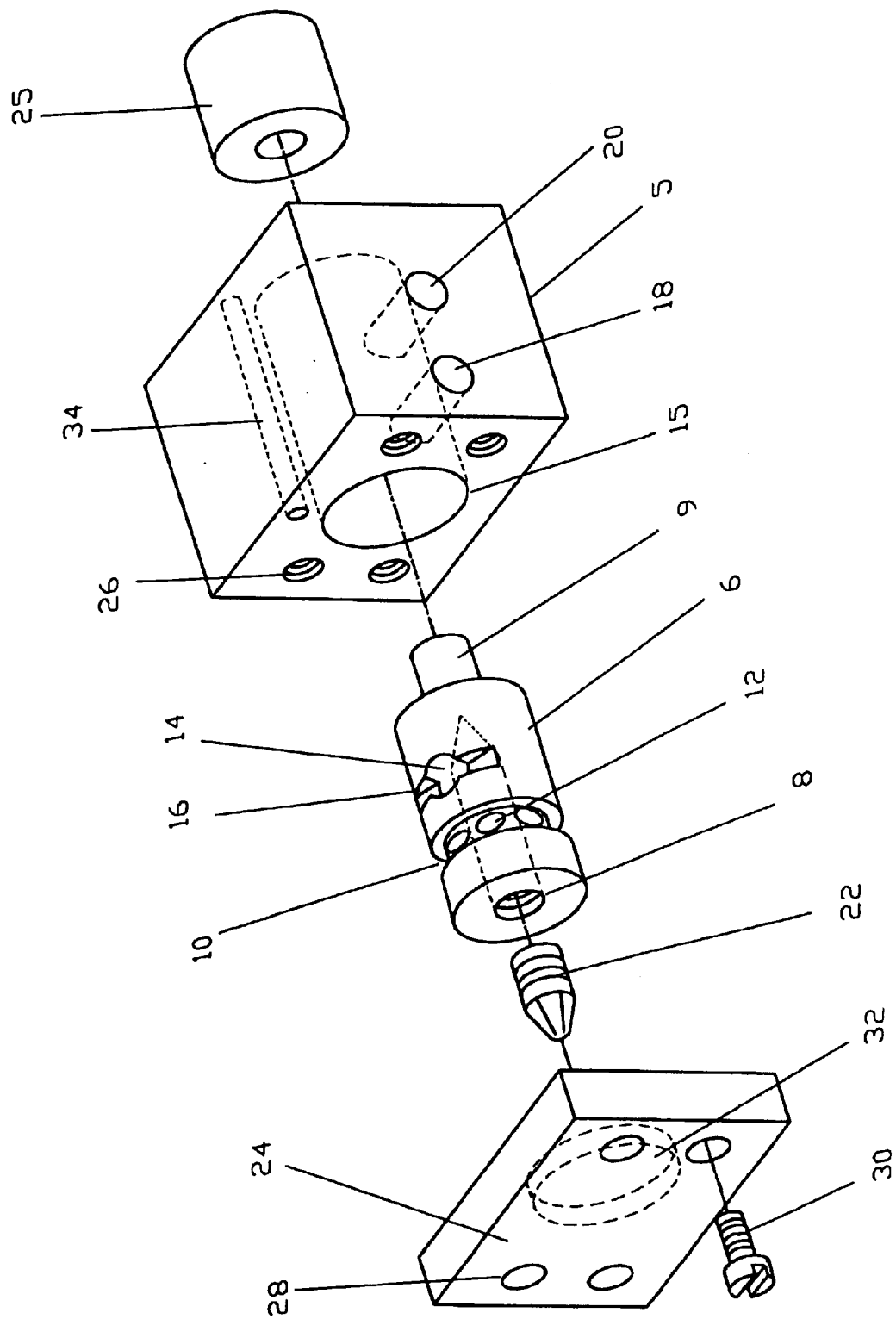
FIG. 1 shows a perspective exploded view of the servovalve, identifying the parts thereof.

Referring to FIG. 1, a valve housing or body 5 has a cylindrical bore 15 through its center.

A cylindrical spool 6 of slightly smaller diameter than the bore is fit thereto to form an assembly in which the spool can be readily rotated. Close fitting (less than 0.001 inch) between such spools and bores is commonly performed by producers of servovalves, using well-known techniques of honing and lapping. Such close fitting serves to minimize the internal leakage of the servovalve, but it is best accomplished when the spool and the bore are simple cylindrical shapes, free of obstructions, such as are described herein. The spool has an axial hole 8 extending partway along its length. This hole is threaded at its open end to accept a pivot screw 22, which, when assembled, locates the spool axially in the bore by resting against the bottom of counterbore 32 in endplate 24. The pivot screw also serves to seal the axial hole, and may be treated with an appropriate sealant for that purpose. In the preferred embodiment of the present invention, the pivot screw is of the "patch lock" type in which an elastomeric plug in the spool threads (not shown) serves to facilitate adjustment and sealing.

The axial hole in the spool communicates with an annular inlet groove 10 in the spool through one or more radial holes 12. This inlet groove is aligned with the inlet port 18 in the body when assembled. Spaced along the spool axis, further away from the open end of the axial hole, is a perpendicular cross hole 14 which also intersects the axial hole. The cross hole connects a pair of, preferably identical, diametrically opposed slots cut partially through the spool on the same plane, one of which is shown as outlet slot 16. In the assembly, this outlet slot is positioned so as to partially intersect an outlet port 20 in the body, the amount of this intersection being dependent upon the angular position of the spool.

It will be recognized by those skilled in the art that, in operation, the body inlet port would be connected to a source of fluid under pressure (not shown) and the outlet port would be connected to a device requiring regulated flow (not shown) or, in certain applications, to atmosphere or to a low pressure fluid reservoir. The inlet and outlet ports can be provided with threads for this purpose, or the valve mounted to a manifold with a flat mating surface and sealed with appropriate gaskets or O-rings in a conventional manner.

The endplate has suitable holes 28 for screws 30 to allow attachment of the endplate to the body at threaded holes 26. When attached, the endplate counterbore encompasses a drain hole 34 through the body, which serves to prevent pressure buildup in the endcap counterbore which would force the spool out of its axial position. The opposite end of the spool has a cylindrical shaft 9 intended for connection to a suitable source of rotational motion such as a stepper motor or limited angle torque motor, shown schematically as a motor 25. In the preferred embodiment, the spool is connected to a limited angle torque motor and controlled with a system for controlling its position, as described in U.S. Pat. No. 6,034,499 to Tranovich.

Figure 2:
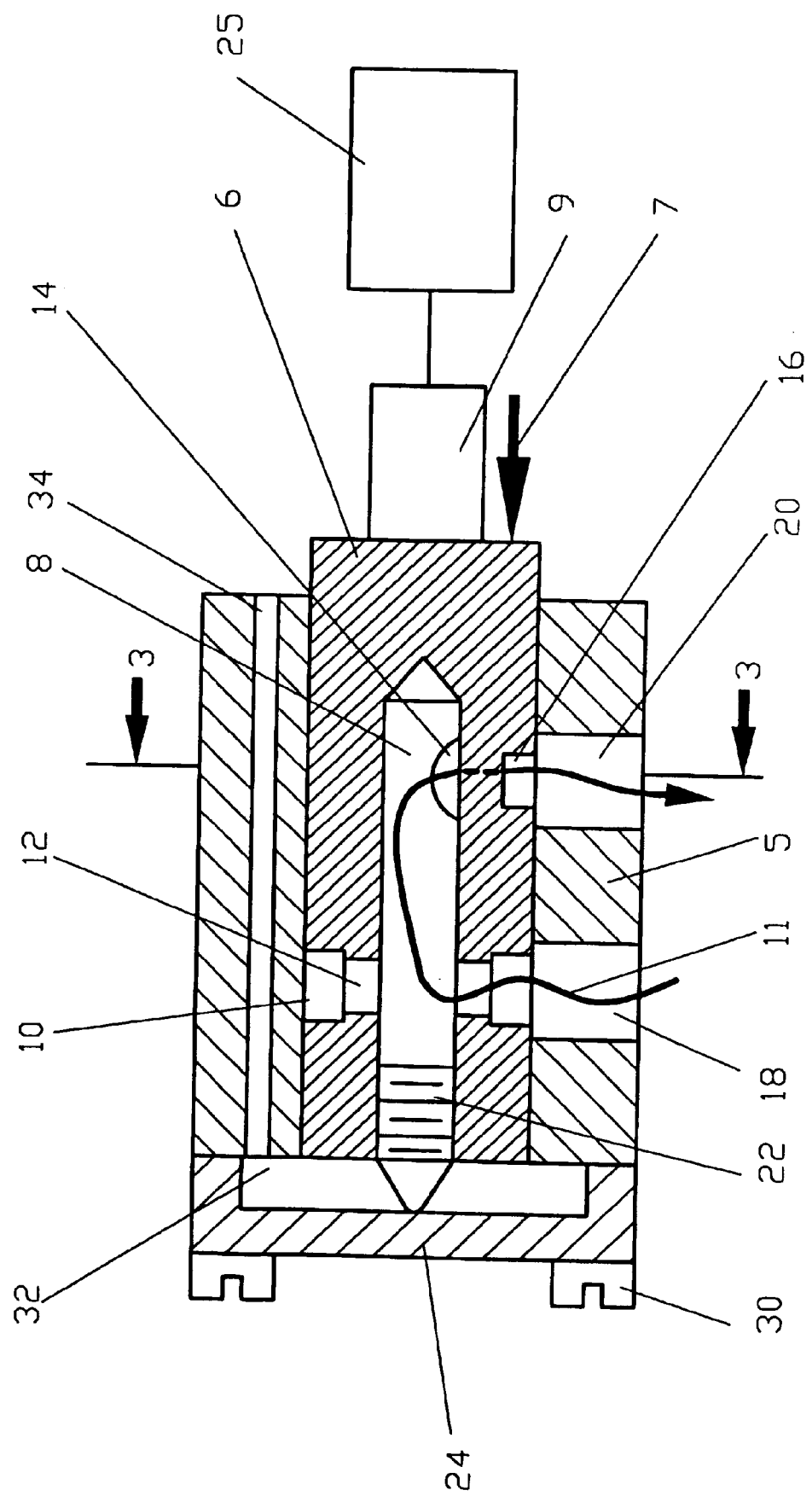
FIG. 2 is a cross section of the assembled servovalve taken on a vertical plane through the central axis. This figure shows the relationships of the various parts in the assembly.

Referring to FIG. 2, the relationships of the parts in the assembly can be more clearly seen. The inlet groove 10 is aligned with the center of inlet port 18. The slots 16 and 16' (not shown) are axially aligned with the center of the outlet port 20. The pivot screw 22 can be seen closing the axial hole 8, and locating the spool axially in the housing bore by resting against the endplate 24 inside counterbore 32. The motor is again shown schematically as 25. To urge contact between the pivot screw and the endplate counterbore, an axial restraining force 7 must be generated by a spring or similar device (not shown). In the preferred embodiment of the invention, this force is supplied by magnetic restoring forces in the motor. It will be apparent to those skilled in the art that this force could also be supplied by a mechanical spring, a compliant coupling member, or other devices. The magnitude of the restraining force required need only be sufficient to overcome effects of gravity if the valve is oriented with the pivot screw "up", and forces due to any vibration or acceleration to which the valve may be subjected in application. Alternatively, the spool could be rigidly attached to a motor shaft and the motor fastened to the body such that the motor provides for the axial location of the spool. In such an embodiment, the pivot screw could become merely a plug to seal the open end of the axial hole in the spool. In the preferred embodiment, the shape of the end of the pivot screw is spherical, providing point contact with the end plate. This point of contact is lubricated with a suitable lubricant grease.

The drain hole 34 is shown open to atmosphere, which would be appropriate for a servovalve used for controlling the flow of air (a pneumatic servovalve). For other applications, the fluid media could be a liquid or corrosive or flammable gasses which cannot be allowed to escape to atmosphere. In those cases, the motor end of the servovalve would be enclosed in a sealed housing and that housing connected to the drain hole, such that equal pressures would exist on both ends of the spool balancing the axial forces thereon.

The path of fluid flow through the valve is depicted by the arrow 11. The cross hole 14 is only partially visible in this view, so the flow path is shown as dashed line where it is provided by the cross hole.

OPERATION OF THE INVENTION

Referring now to FIGS. 3a and 3b, the operation of the valve can be more readily seen. Fluid pressure at the inlet port and communicated through the spool via the inlet groove, the radial holes, and the axial hole is presented at the outlet cross hole 14. This fluid then enters outlet slot 16 which is shown in FIG. 3a at a position where it is not yet overlapping the outlet port, so that no fluid is flowing. As the spool is rotated counterclockwise about its axis of rotation 19 the outlet slot increasingly overlaps the outlet port as shown in FIG. 3b. The diametrically opposed occluded slot 16' is presented to and occluded by the interior of the bore. The pressure from this slot acting on the bore and spool serves to exactly balance the pressure force provided by the outlet slot 16. In this manner, excessive side loads on the spool are prevented, allowing minimal actuating torque and reducing mechanical hysteresis of the servovalve. It can be seen that another advantage accrues to this symmetrical construction of the spool. During assembly, the spool can be inserted into the housing with either slot facing the outlet port interchangeably, easing the assembly process.

Figure 4B:
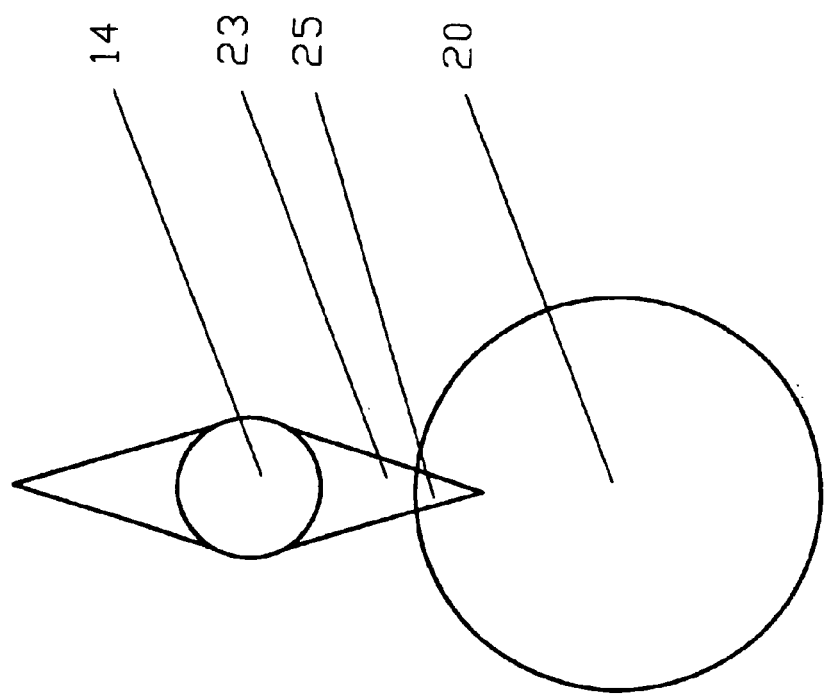
FIG. 4b is a similar planar view with an alternate shape for the outlet slot.
Figure 4A:
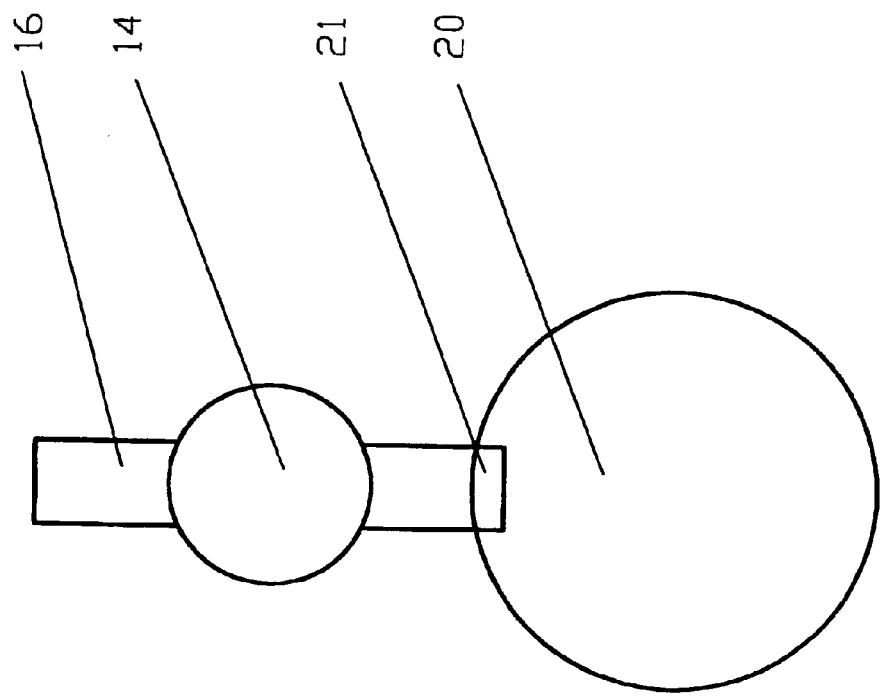
FIG. 4a is a planar (flattened) view of the outlet slot and its intersection with the outlet port, depicting how the area of intersection changes with angular stroke.

The planar representation in FIG. 4a shows the area of overlap between the outlet slot and the outlet port with the valve in a partially open condition. It can be seen that the area of overlap 21 between the outlet slot 16 and the outlet port 20 is in the approximate form of a rectangle, which, as the length of the sides is increased, causes the area to be increased in a linear relationship. The relatively small slot width in relation to the large outlet hole assures that the non-linearity due to the curved surface of the edge of the outlet port is negligible compared to the total angular stroke of the valve. In the preferred embodiment, the angular stroke of the servovalve is limited such that, at one angular stroke extreme, there is a small angle before the outlet slot begins to overlap the outlet port, thus assuring complete shutoff of the valve in the closed position. The angular stroke in the other direction is limited such that the cross hole never intersects the outlet port, thus preserving the linear flow relationship.

FIG. 4b shows a similar planar view of an alternate implementation wherein the maximum flow rate of the valve could be increased. The shaped outlet slot 23 is a triangle with its legs tangent to the cross hole. In this case, the cross hole would be allowed to intersect the outlet port at the maximum flow rotation angle. A similarly shaped slot or an opening with the same area as the slot would be provided on the opposite side of the spool to maintain pressure balance. The flow gain of the valve would not be linear, because the area of overlap 25 varies as the square of the angle of rotation. However, referring again to U.S. Pat. No. 5,242,150 by Shiffler and Loy, an arcuate opening as described in their disclosure could be adapted to linearize the area relationship. The tradeoff for the increased maximum flow would then be significantly increased cost to manufacture the irregularly shaped outlet slots, using electrical discharge machining (EDM) or other unusual processes. In cases where the outlet slot is a complex configuration which must be produced by expensive processes such as EDM, the occluded slot could be of a simpler shape such as a straight sided slot, as long as the occluded slot presents the same area as the outlet slot. It will be apparent to those skilled in the art that a wide variety of outlet slot shapes could be proposed to achieve various relationships between area and rotation angle, and thus flow and rotation angle, for other purposes and applications, without departing from the teachings of this invention.

SUMMARY, RAMIFICATIONS, AND SCOPE

Thus a rotary 2-way servovalve has been described which provides the necessary and desirable performance characteristics of linear flow gain, low actuating torque, and low internal leakage. This is accomplished in a very simple design that can be readily constructed using standard machine tools. The product has been built and extensively tested, and has been shown to meet all of the design goals.

While the above description contains many specifics, these should not be construed as limitations on the scope of the invention, but rather as exemplification of one preferred embodiment thereof. Many other variations are possible. For example, the outlet slot could be made in a variety of shapes to provide alternative flow gain characteristics for special applications (as discussed briefly, above). The pivot screw could be configured with alternate end shapes such as a point or small flat. The spool could be provided with grease grooves for lubrication in gas control applications. Multiple outlet slots could be provided at various axial locations along the spool to provide increased flow. The outlet ports in the housing could be made in a square or rectangular shape. A sleeve could be provided instead of the solid body as is described herein. The configuration and position of the inlet and outlet ports could be changed in numerous ways.

Accordingly, the scope of the invention should be determined not by the embodiments illustrated, but by the appended claims and their legal equivalents.

We claim:

1. A rotary valve for controlling the flow of fluids comprising:
   (a) a body having an exterior surface and a cylindrical bore, a first conduit in said body from said exterior surface and communicating with said bore providing a passage for the flow of fluid from a source of fluid, a second conduit displaced along the axis of said bore also communicating with said bore to provide a passage for a discharge of fluid;
   (b) a cylindrical spool rotationally disposed within said body, said spool having an open end and a closed end, and an axial hole partway therethrough, said axial hole extending from said open end of said spool and terminating prior to said closed end of said spool, said spool also having an exterior annular groove disposed so as to communicate with said first conduit in said body, said spool also having at least one radial passage communicating from said groove to said axial hole, said spool also having a cross hole perpendicular to said axial hole and extending completely through said spool in a plane intersecting said second conduit in said body, said spool also having a first slot with maximum width smaller than the diameter of said second conduit and of a depth less than halfway through said spool and positioned so as to intersect said cross hole in said spool, said slot and said spool being positioned angularly within said bore in said body such that said first slot is occluded from said second conduit in said body with said spool at a first angular position;
   (c) plug means disposed within said axial hole near said open end of said spool, and plug fastening means to affix said plug means within said axial hole;
   (d) rotating means affixed to said spool for rotating said spool through a limited angle within said body
whereby a source of fluid under pressure from said first conduit is gradually connected to said second conduit as said spool is rotated through a limited angle.

2. A rotary valve as in claim 1 wherein said spool also defines a second slot of like size, shape, and depth to said first slot; positioned diametrically opposed to said first slot on said spool and communicating with said cross hole.

3. A rotary valve as in claim 2 wherein said first slot and second slot are in the shape of triangles with legs that are tangent to said cross hole.

4. A rotary valve as in claim 1:
   (a) also containing an end plate disposed against the end of said body closest to said first conduit and perpendicular to said bore;
   (b) also containing fastening means for attaching said endplate to said body;
   (c) said plug means also containing pivot means extending from said plug means to a point beyond said spool and resting upon said end plate;
whereby said spool is axially located within said body by said pivot means resting on said endplate.

5. A rotary valve as in claim 4 wherein said body also contains a third conduit parallel to said bore and in fluid communication with a counterbore in said endplate and said pivot means resting upon the plane surface of said counterbore.

6. A rotary valve as in claim 1 wherein said rotating means is a stepper motor.

7. A rotary valve as in claim 1 wherein said rotating means is a servo motor.

8. A rotary valve as in claim 1 wherein said rotating means is a limited angle torque motor.

9. A rotary valve as in claim 1 wherein said plug fastening means comprises screw threads in said open end of said axial hole in said spool and matching screw threads on said plug means.

10. A rotary servovalve comprising:
    (a) a housing having an exterior surface and defining an internal cylindrical surface disposed within said housing;
    (b) an inlet port at said exterior surface for connection to a source of fluid under pressure and a discharge port at said exterior surface for connection to a system requiring regulated flow;
    (c) an inlet passage connecting said inlet port to said internal cylindrical surface and a discharge passage connecting said outlet port to said internal cylindrical surface;
    (d) a spool rotatably disposed within said housing and having an outer cylindrical surface in slidable contact with said internal cylindrical surface;
    (e) said spool defining an inlet opening, a discharge opening, and a first flow passage;
    (f) said inlet opening comprising an annular groove on said outer cylindrical surface of said spool and at least one radial flow passage for connecting between said annular groove and said first flow passage;
    (g) said discharge opening comprising a first slot and a second flow passage for connecting said first slot to said first flow passage;
    (h) motor means for rotating said spool in said housing through a limited angle.

11. A rotary servovalve as in claim 10 wherein said spool also defines a second slot substantially similar in size and shape to said first slot and disposed on the opposite side of said spool; said second slot connected to said first flow passage by a third flow passage.

12. A rotary servovalve as in claim 10 wherein said first flow passage comprises an axial hole partway through said spool; a plug disposed within an open end of said axial hole and sealant means to prevent fluid leakage past said plug.

13. A rotary servovalve as in claim 10 wherein said motor means is a servo motor.

14. A rotary servovalve as in claim 10 wherein said motor means is a stepper motor.

15. A rotary servovalve as in claim 11 wherein said first slot and said second slot comprise a pair of diametrically opposed circular segments of depth less than half the diameter of said spool in the cross section of said spool in the plane of said first and second slots.

16. A rotary servovalve as in claim 11 wherein said second flow passage and said third flow passage are combined into a single hole perpendicular to said first flow passage and bisecting said first and second slots.

17. A rotary servovalve comprising:
    (a) a body having an exterior surface and defining an internal cylindrical surface disposed within said body;
    (b) an inlet port at said exterior surface for connection to a source of fluid under pressure and a discharge port at said exterior surface for connection to a device requiring flow regulation;
    (c) a spool rotationally disposed within said body and having an outer cylindrical surface in slidable contact with said internal cylindrical surface;
    (d) said spool defining an inlet opening in the form of an annular groove on said outer cylindrical surface; a central axial flow passage, at least one radial flow passage connecting said annular groove to said axial flow passage; at least one cross flow passage perpendicular to and connecting to said axial flow passage; a discharge slot, and an occluded slot;
    (e) said discharge slot having straight sides, width less than the span of said discharge port, and depth less than half of the diameter of said spool, said slot disposed so as to be bisected by said cross flow passage;
    (f) said occluded slot being substantially identical in shape and size to said discharge slot and disposed diametrically opposite to said discharge slot on said spool;
    (g) said axial flow passage having one open end and one closed end, said open end having interior screw threads therein;
    (h) an end plate disposed at the end of said body perpendicular to said bore and attached to said body by fastening means;
    (i) said interior screw threads in said axial flow passage accepting a pivot device comprising a threaded plug and an extended axial protrusion pivotably contacting said endplate;
    (j) a motor for rotating said spool in said body through a limited angle.

18. A rotary servovalve as in claim 17 wherein said motor is a step motor.

19. A rotary servovalve as in claim 17 wherein said motor is a limited angle servo motor.

20. A rotary servovalve as in claim 17 wherein said body has a drain hole parallel to said bore and in fluid communication with said end cap.

* * * * *